Jan. 31, 1967 KENJIRO TAKAYANAGI 3,301,946

CONTROL SYSTEM FOR MAGNETIC RECORDING DEVICE

Filed June 5, 1962 3 Sheets-Sheet 1

INVENTOR

KENJIRO TAKAYANAGI by Otto John Munz

ATTORNEY

Jan. 31, 1967 KENJIRO TAKAYANAGI 3,301,946

CONTROL SYSTEM FOR MAGNETIC RECORDING DEVICE

Filed June 5, 1962 3 Sheets-Sheet 2

INVENTOR
KENJIRO TAKAYANAGI
by
ATTORNEY

Jan. 31, 1967 KENJIRO TAKAYANAGI 3,301,946

CONTROL SYSTEM FOR MAGNETIC RECORDING DEVICE

Filed June 5, 1962 3 Sheets-Sheet 3

INVENTOR
KENJIRO TAKAYANAGI
by Otto John Munz
ATTORNEY

United States Patent Office 3,301,946

Patented Jan. 31, 1967

3,301,946

CONTROL SYSTEM FOR MAGNETIC RECORDING DEVICE

Kenjiro Takayanagi, Tokyo, Japan, assignor to Victor Company of Japan, Ltd.

Filed June 5, 1962, Ser. No. 200,209
Claims priority, application Japan, June 21, 1961, 36/22,143
4 Claims. (Cl. 178—6.6)

The present invention relates to a control system for scanning a magnetic medium in recording and reproducing high-frequency signals such as television signals on the magnetic medium, and has particular reference to an improved arrangement comprising a control system for obliquely scanning a magnetic medium in which television image signals are recorded on the medium before the television image signals are reproduced after rotation of a magnetic reproducing head which obliquely scans the magnetic medium to develop a control signal for stabilizing the scanning condition of the magnetic head rotation.

The invention is characterized by the fact that the desired electric signal is recorded on the magnetic medium by obliquely scanning of the recording magnetic head, and substantially at the same time, the reproducing magnetic head develops a delayed recorded signal by the reproducing magnetic head obliquely scanning the magnetic medium so that two pulses are developed, and by a control or inspection comparison means, the two pulses are compared in time by delaying the earlier pulse to coincide with the latter pulse to develop a control signal for driving means for mechanically rotating the magnetic heads.

A complete and thorough understanding of the invention may be had from the following description of a particular embodiment of the invention. In the description, reference is made to the accompanying drawings, in which like reference numerals designate like parts throughout the figures thereof and wherein.

Figure 1:
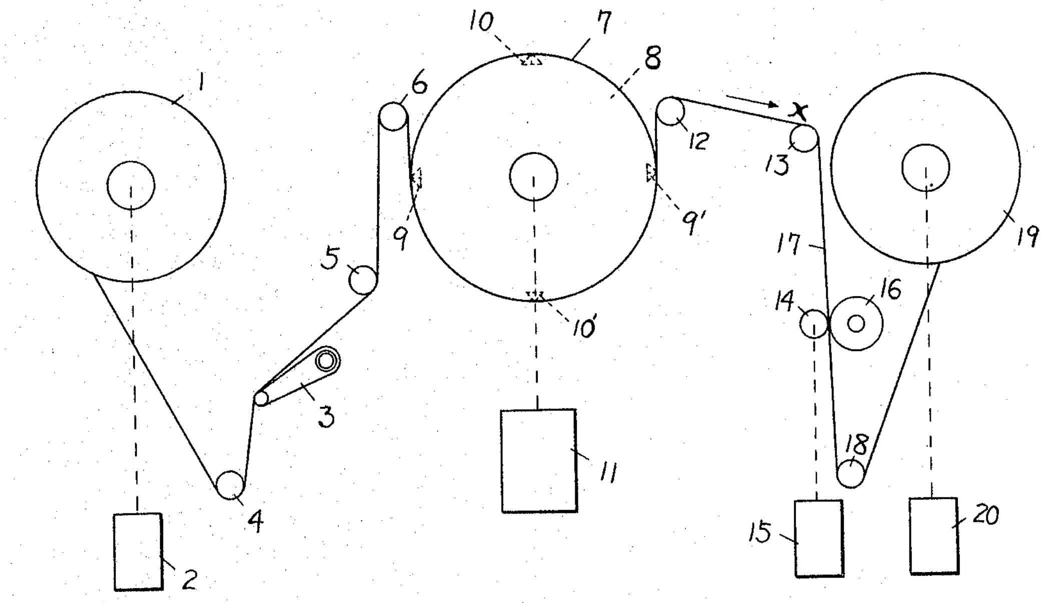
FIGURE 1 is a schematic arrangement of an embodiment of the invention.

Referring now more particularly to the drawings, FIGURE 1 shows schematically the apparatus to which the system of the invention is directed. The system includes a supply reel 1 driven by a reel motor 2 directly connected to the reel 1, a tensioned arm 3 and guide rollers 4, 5 and 6. A guide drum 7 is shown on which the tape 17 is threaded around so that the magnetic medium 17 is in contact with a substantial portion of the guide drum 7. A rotation disk 8 is installed coaxially with the guide drum 7 so that it is capable of freely rotating within the guide drum, and the outer circumference of the rotation disk is provided with magnetic recording heads 9, 9' disposed on opposite sides of the rotation disk while magnetic reproducing heads 10, 10' are also oppositely disposed on the peripheral portion of the rotation disk and displaced in quadrature to the magnetic heads 9, 9'. These magnetic heads are arranged and constructed so that their extremities extend beyond the circumferential surface and above the guide drum 7.

The rotation disk 8 is driven by a head motor 11. Guide rollers 12 and 13 feed the tape 17 along a path so that the tape 17 is drawn by a capstan 14 which is driven by the capstan motor 15. A contact roller 16 engages the magnetic tape 17 and the capstan 14 so that the tape 17 is drawn from the supply reel over the path above described.

A guide roller 18 enables the tape to proceed along its path so that the tape is fed onto a winding reel 19 driven by a reel motor 20 which rotates the reel in taking up the tape. The apparatus is arranged as above-described, and as to be more particularly illustrated, so that the magnetic tape records one field of a television image signal together with a certain number of signals on the magnetic tape by obliquely scanning a sufficiently long locus thereon by means of the magnetic recording head and, after a substantially short predetermined delay, reproducing the recorded signal by means of the magnetic reproducing head by obliquely scanning the recording in response to the recording head, for developing a control signal for stabilizing and controlling the scanning condition of the magetic head to allow the magnetic head to scan the magnetic medium under a stable condition at all times.

The operation of the arrangement provides for feeding the magnetic tape 17 from the supply reel 1 through the threaded arrangement shown in FIGURE 1 and thus onto the winding reel 19. Capstan 14 as driven by the capstan motor 15 feeds the magnetic tape in the manner shown by the arrow X, and the rotation disk 8 rotates so that its peripheral portion moves at a greater velocity than the velocity of the tape passing over the guide drum 7. In this manner, the magnetic recording heads 9 and 9' as well as the reproducing heads 10, 10', scan the magnetic tape 17 alternately leading to the reproduction of the recorded signals on the surface of the tape. The preferred arrangement is that the scanning is done in a direction obliquely to the direction of the instantaneous velocity of the tape.

Figure 2:
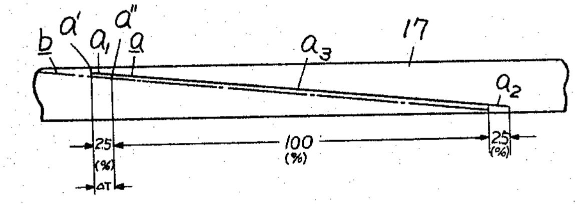
FIGURE 2 shows the position of the record track exemplarily disposed on a magnetic tape by means of the apparatus shown in FIGURE 1.

The signals recorded on the magnetic tape 17 are shown as the oblique record track *a* as shown in FIGURE 2. When the record track *a* was recorded by the recording head 9, overlapped portions $a_1$, $a_2$, amounting to 2.5% of the total length of the record track are formed on its starting and terminal portions. In other words, if it is proposed that the recording head 9 scan from the upper portion of the magnetic tape 17 toward the lower portion in an oblique manner as shown in forming the record track *a*, then when the magnetic head reaches the vicinity of the lower portion, another recording head 9' will have started to scan from the starting portion of the record track *b* to record the same signal on the tape in the vicinity of the record track *a*, and as the starting portion of the next record track *b*. These are referred to as overlapping portions. In the present invention, these overlapped portions are effectively made use of in order to conduct and develop proper control of the magnetic recording system.

Figure 4:
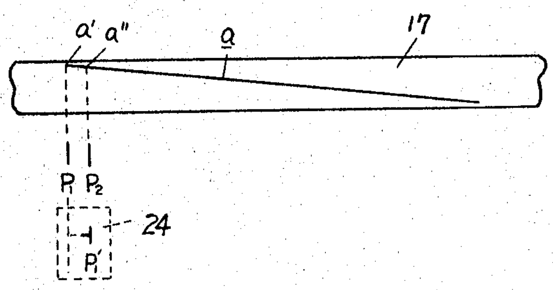
FIGURE 4 shows a record track when the tape is in operation.

If it is assumed that the record track *a* shown in FIGURE 2 has been recorded on the magnetic tape 17 by means of the recording head 9, then the reproducing head 10 which follows the scanning of recording head 9 so that it traces the record track *a* to develop a quadrature signal or signal identified as being delayed 90° in respect to the mechanical arrangement of the recording head 9 and reproducing head 10. The reproducing head 10 is brought into contact with the starting portion *a'* of the record track image signal, and a pulse is generated as the rotation disk 8 scans the starting portion *a'*. The rotating velocity of the magnetic recording heads 9 and 9' as well as the rotation velocity of the reproducing heads 10, 10', are such that the time interval $\Delta T$ of both pulses developed by the reproducing heads 10, 10' are developed as the predetermined time interval between the recording and the reproduction of the image signal. In order that the time relation may be controlled and stably maintained, the record track $a$ recorded on the magnetic tape 17 attains an ideal state in which overlapped parts are formed on its ends by 2.5% respectively while at the center, the recorded part $a_3$ of the image signal is formed by the distribution of 100% as shown in FIGURE 4. Further, a position of each vertical synchronizing signal will be at uniform distances in all times from the starting point of recorded track automatically by way of keeping the relationship between the frequency and phase of the picture signal and the rotating speed and phase of the rotary magnetic head in constant.

Figure 3:
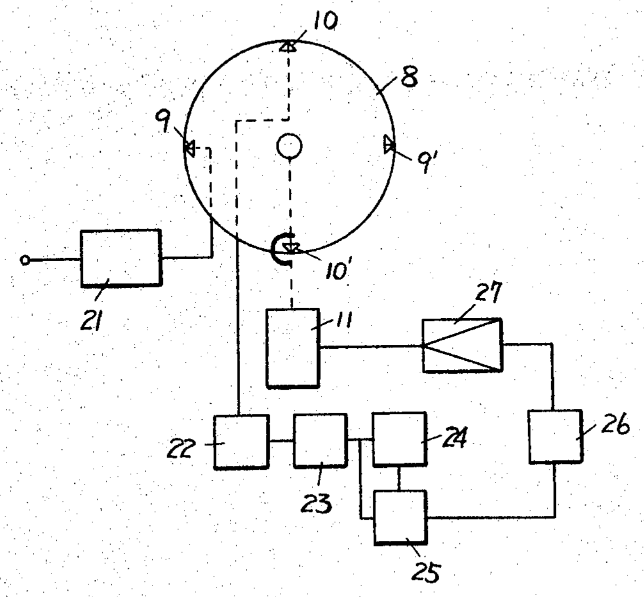
FIGURE 3 shows the control system according to a preferred embodiment of the present invention.

FIGURE 3 shows a modulator 21 to apply the modulated signal to recording head 9, and an amplifier 22 to develop a signal from the tape as developed by the reproducing head 10. The amplified signal of amplifier 22 is applied to a demodulator 23, which in turn is delayed by the delay circuit 24 and is thence applied to a phase localizer 25 for controlling the frequency of an oscillator 26. The output of the oscillator 26 is applied to a power amplifier 27 for driving a head motor 11 synchronously with the output of the oscillator as controlled by the phase localizer 25.

Where the signal recorded on the magnetic tape 17 is a television image signal, the signal to be recorded is modulated in frequency by the modulator 20 prior to being recorded on the magnetic tape 17 by magnetic recording heads 9 and 9'. As described above, the rotation disk 8 is rotated appropriately at the same time that tape 17 passes over the guide drum 7, but at a different rate, so that the above signal is recorded on the magnetic tape. During the recording time, the reproducing head 10 follows and traces on the record track $a$ formed by the first magnetic recording head 9 as above described. When the magnetic reproducing head 10 reaches the starting portion $a'$ of the record track, a pulse $P_1$ as shown in FIGURE 4 is taken off by making use of a rider or pulse shaper of the signal and a pulse $P_2$ is also developed from the starting portion $a''$ of the recording position of the vertical synchronizing signal. These pulses are demodulated by the demodulator 23 and then pulse $P_1$ is delayed in the delay circuit 24 for a required time or a prescribed time interval between said pulses $P_1$ and $P_2$, producing a pulse $P_1'$, hence which pulse and the pulse $P_2$ that has not been fed through said delay circuit 24 are then compared in the phase comparator 25. The phase localizer or comparator 25 is adjusted so that the output is zero when pulses $P_1$ and $P_2$ are in precise coincidence, and there is a control voltage developed in response to non-coincidence of the pulses $P_1$ and $P_2$, such voltage being corresponding to the difference in time of the pulses. The control voltage is applied to control an oscillator 26 to shift the frequency of the oscillator in a direction to accelerate or decelerate the head motor 11 in response to the controlled voltage. In this manner, the head motor 11 is driven synchronously in accordance with the delayed pulse as compared with the initial pulse recorded on the magnetic tape.

Figure 5:
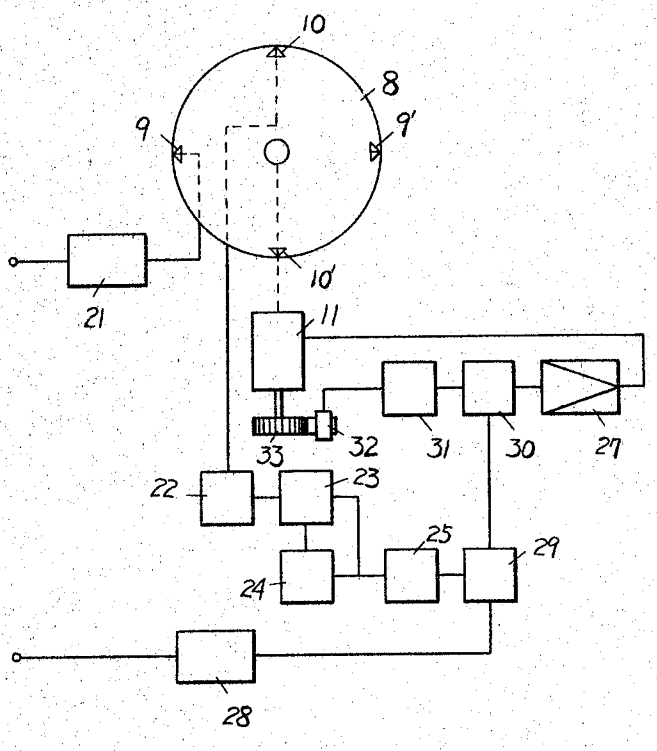
FIGURE 5 shows an arrangement of another practical embodiment of the present invention in which the control system is externally synchronized.

FIGURE 5 shows a further embodiment of the present invention in which a frequency multiplier 28 may be externally applied to control the head motor 11 when the frequency multiplier output is connected to a relay circuit 29 for applying the output of the phase comparator 25 and the frequency multiplier 28 to the automatic frequency control circuit 30. Said frequency multiplier 28 is utilized for shortening the sampling period in the A.F.C. circuit 30 for a pulse signal to be detected by the detector 32 and for increasing accuracy. The automatic frequency control circuit 30 compares the frequency differences of the signals developed from the relay circuit 29 with the signal in the amplifier 31 which is developed from a transducer amplifier arrangement 22 and a gear train arrangement 33 in which the number of teeth of the gear train is directly related to the frequency of the frequency multiplier 28. Since the means for obtaining the control signal in the circuit shown in FIGURE 5 is generally the same as that shown basically in FIGURE 3, the control signal is obtained in the manner as above described in connection with FIGURE 3. The control signal is not obtained without rotation of the rotation disk 8, or the translation of the magnetic tape over the guide drum 7. The relay circuit 29 is brought into operation by means of the control signal obtained as a result of the above rotation and translation of the rotation disk 8 and magnetic tape 17, respectively, so that the electric signal of the control signal is zero when the velocities of the magnetic tape over the guide drum 7 are properly phased with respect to the rotation of the rotation disk 8 as driven by the head motor 11. The synchronizing signal applied by the frequency multiplier 28 may be impressed on the A.F.C. circuit 30 so that the pulse signal detected by the phase comparator 25 and the gear train 33 may change the rotation of the head motor 11 in accordance with the frequency differences thereof. The A.F.C. circuit 30 is responsive to the signals of the relay circuit 29 as well as the amplifier 31 and the rotation of head motor 11 as it affects the amplifier 31. The rotation of the head motor 11 is controlled so that constant and regulated rotation of the rotation disk 8 is achieved by the control system. At the instant when the control signal is obtained by means of the control system, the relay circuit 29 commences to operate and the head motor 11 is stabilized by means of the frequency of the frequency multiplier 28 and the rotation of the head motor is therefore controlled in response thereto.

The frequency control system of the present invention is capable of providing substantially accurate control of the rotation disk in a magnetic recording and reproducing system for television signals so that improved scanning of magnetic medium for high-frequency signals is obtained. It is within the scope of the present invention that the recording and reproducing heads may be differently arranged on a rotation disk for achieving phase comparison of signals after appropriate delay of the reproduced signals from the magnetic medium as has been exemplarily described above.

It is therefore apparent that the invention is advantageous in cases involving developing a controlled rotation of a disk for rotation of reproducing and recording heads in connection with scanning signals on a magnetic medium in which the control system is characterized by the fact that the desired electric signal is recorded on the magnetic medium by a recording head and the reproducing head scans the signal to develop a pulse, which is then delayed in time for comparison with a second pulse to develop a control signal for driving and controlling the rotation of a motor that rotates the magnetic medium or the magnetic reproducing and recording heads.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

I claim:

1. A control system comprising a means for recording a video signal in parallel oblique tracks on magnetic medium by means of a magnetic recording head, signal means for providing two pulses on the same transverse sweep of a recording track, a means for picking up in sequence two pulses which differ in timing from predetermined two points in a recorded track by reproducing the recorded track where being recorded the video signal by means of a magnetic reproducing head, a rotary member being provided with said recording head and reproducing head on its circumference, a driving source for driving and rotating said rotary member, a means for comparing a time interval of those two pulses picked up by said picking up means and a control means for controlling a rotating speed of said rotary member driven by said driving source in accordance with an output of said comparing means.

2. A control system comprising a means for recording a video signal in parallel oblique tracks on magnetic medium by means of a magnetic recording head making overlapping portions at both ends, signal means for providing two pulses on the same transverse sweep of a recording track including a signal at the starting point of the transverse sweep and a vertical synchonizing signal spaced therefrom, a means for picking up in sequence the first pulse from a rise-up of the signal at the starting point of the recorded track and the second pulse from a vertical synchronizing signal being at a position spaced predetermined distance from said starting point of said track by reproducing the recorded track where being recorded the video signal by means of a magnetic reproducing head, a rotary member being provided with said recording head and said reproducing head on its circumference, a driving source for driving and rotating said rotary member, a means for comparing a time interval of those two pulses picked up by said picking up means and control means for controlling a rotating speed of said rotary member drive by said driving source in accordance with an outout of said comparing means.

3. A control system comprising a means for recording a video signal in parallel oblique tracks on magnetic medium by means of a magnetic recording head making overlapping portions at both ends, signal means for providing two pulses on the same transverse sweep of a recording track including a sginal at the starting point of the transverse sweep and a vertical synchronizing signal spaced therefrom, a means for picking up in sequence the first pulse from a rise-up of the signal at the starting point of the recorded track and the second pulse from a vertical synchronizing signal being at a position spaced predetermined distance from said starting point of said track by reproducing the recorded track where being recorded the video signal by means of a magnetic reproducing head, a rotary member being provided with said recording head and said reproducing head on its circumference, a motor for driving and rotating said rotary member, a delay means for delaying said first pulse for a predetermined time, a phase comparator to compare phases of said two pulses and to produce an output according the phase differences, a means for supplying respectively said first pulse through said delay means and said second pulse directly to said phase comparator and a means for controlling a frequency of an electric power source to drive said motor in accordance with the output of said phase comparator.

4. A control system as defined in claim 3, including a means for picking up pulses in response to the rotating speed of said rotary member, an A.F.C. circuit for controlling said electric power source in accordance with pulses picked up by said picking up means and standard pulses, a means for supplying pulse derived from synchronizing signals as the standard pulses and a means for supplying said pulses from said supplying means to said A.F.C. circuit when there being no output at said phase comparator.

References Cited by the Examiner

UNITED STATES PATENTS

| | | | |
|---|---|---|---|
| 2,783,426 | 2/1957 | Pittman | 318—314 |
| 2,913,652 | 11/1959 | Greenberg et al. | 318—314 |
| 3,012,106 | 12/1961 | Brenner et al. | 179—100.2 |
| 3,042,756 | 7/1962 | Buslik | 179—100.2 |
| 3,059,163 | 10/1962 | Kinney et al. | 318—314 |
| 3,172,949 | 3/1965 | Okazaki et al. | 179—100.2 |

FOREIGN PATENTS

| | | |
|---|---|---|
| 717,726 | 11/1954 | Great Britain. |

BERNARD KONICK, *Primary Examiner.*

J. R. GOUDEAU, P. F. ROTH, *Assistant Examiners.*